United States Patent [19]

Hatori et al.

[11] 4,057,171
[45] Nov. 8, 1977

[54] ARTICLE STORAGE DEVICES WITH ARTICLE RELEASERS FOR USE IN VENDING MACHINES

[75] Inventors: Kunitake Hatori, Maebashi; Toshihiko Ozaki; Ryohei Kondo, both of Isesaki, all of Japan

[73] Assignee: Sankyo Electric Company Limited, Isesaki, Japan

[21] Appl. No.: 707,210

[22] Filed: July 21, 1976

[51] Int. Cl.² ................................................ B65G 3/44
[52] U.S. Cl. .................................... 221/6; 221/131; 221/298
[58] Field of Search ............... 221/114, 124, 131, 237, 221/297, 298, 6

[56] References Cited

U.S. PATENT DOCUMENTS

| 1,139,711 | 5/1915 | Ogden | 221/298 X |
| 2,816,719 | 12/1957 | Richert | 221/298 X |
| 3,194,432 | 7/1965 | Breitenstein et al. | 221/131 X |
| 3,837,528 | 9/1974 | Rakucewicz | 221/298 X |

*Primary Examiner*—Robert B. Reeves
*Assistant Examiner*—David A. Scherbel
*Attorney, Agent, or Firm*—Hopgood, Calimafde, Kalil, Blaustein and Lieberman

[57] ABSTRACT

An article storage unit device for use in a vending machine used for discharging an article at one time. A housing of the unit device defines at least one vertically extending article storing space and has a bottom opening. The housing is provided with a first stop adjacent the bottom opening by which an article is held in the space. A predetermined number of articles are stacked on the lowermost article within the space. The housing is also provided with a second stop for holding an article adjacent to and above the lowermost article. The first stop is releasable to discharge the lowermost article through the bottom opening by the gravity. The second stop is normally released and operates to hold the article for at least a time period during which the first stop is released. For the first and second stop, a cam may be used which is mounted on a drive shaft. The article storing space is adjusted by moving a movable plate within the space.

11 Claims, 9 Drawing Figures

4,057,171

ARTICLE STORAGE DEVICES WITH ARTICLE RELEASERS FOR USE IN VENDING MACHINES

BACKGROUND OF THE INVENTION

This invention relates to vending machines and, in particular, to article storage unit devices used in the machines.

Generally speaking, vending machines are classified two types, one of which is one vending a kind of articles and the other being one vending two or more kinds of articles. The latter is provided with manually operated buttons for selecting kinds of articles.

In either type, the machine has an article storage device, article discharge means for discharging one article at a time from the storage device, and article transporting means for transporting the discharged article to an access station, in a machine cabinet.

It is required in vending machines that a number of articles can be stored in the article storage device to decrease the number of times of article feeding, or loading, operation.

Moreover, the machines are desired to be small in the volume, while a number of articles can be stored.

Furthermore, it is required that the article feeding operation is easy and ready.

SUMMARY OF THE INVENTION

It is an object of this invention to provide a vending machine in which an increased number of articles can be stored with little increase of the volume of the machine.

It is another object of this invention to provide a vending machine which is simple and easy in the article feeding operation.

A further object of this invention is to provide an article storage unit device with article discharging means which is suitable for use in a vending machine and which is simple in the construction in order to realize above objects.

Another object of this invention is to provide a unit device which is provided with one or more vertically extending article stacking spaces partitioned by vertical plates, and arranged in a horizontal direction, and which is slidably mounted in the vending machine to be drawn out of the machine in the horizontal direction along which the article storing spaces are arranged. Accordingly, by mounting such units side by side a storage space within the machine cabinet can be used with little loss while securing the simple operation for feeding articles in each unit.

According to this invention, an article storage unit device is obtained which comprises a housing defining one or more article storing vertically extending spaces which are pertitioned by vertical plates and arranged in a horizontal direction and being provided with a bottom opening. In each vertically extending space, articles are stored in a vertical stack. The housing is provided with first stop means at a position adjacent to the bottom opening and for each vertically extending space, which is for holding the lowermost article in the stack within the corresponding space. The first stop means are releasable for permitting the lowermost article to fall through the bottom opening by the gravity. The housing is also provided with second stop means for each article storing space which is for holding an article adjacent to, and above, the lowermost article in the stack within the corresponding space at a time period when the first stop means are released. The first and second stop means are operated by a common driver for the releasing condition of the former and for the holding condition of the latter. Accordingly, articles in the stack within one article storing space are discharged one at a time.

In provision of the plurality of article storing spaces, pairs of first and second stop means of respective storing spaces are so arranged that each pair is operated at a time different from the other pairs.

The unit device may be slidably mounted in a vending machine to be drawn out of the machine and, in particular, if it is one which is provided with a plurality of article storing spaces arranged in a horizontal direction, it may be mounted slidably in the horizontal direction. As a result, feeding operation of articles is easily carried out.

The unit device may be provided with a space adjusting plate or plates within the article storing space or spaces.

Moreover the unit device may be provided with means for detecting the empty of each article storing space.

Further objects, features and aspects of this invention will be understood from following description of embodiments of this invention referring to annexed drawings.

DETAILED DESCRIPTION OF PREFERRED EMBODIMENTS

Figure 1:
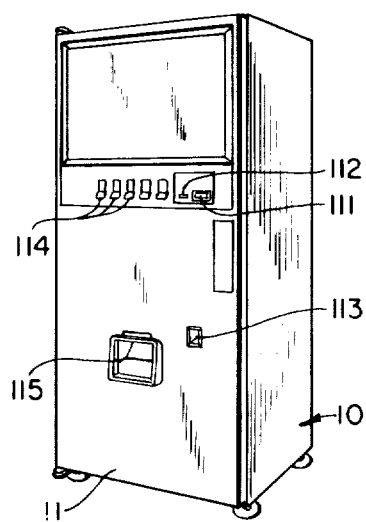
FIG. 1 shows a perspective view of an embodiment of a vending machine according to this invention.

Referring to FIG. 1 which shows a perspective view of an embodiment of this invention, the shown vending machine comprises a machine cabinet 10 with a front, or loading, door 11 which is hinged to the cabinet and selectively openable. The front door 11 is provided with a coin depositing opening 111, a manually operated lever 112 for returning deposited coin or coins, a coin returning opening 113 through which returned coins are obtained, article selecting buttons 114 (five buttons are shown) by which a desired kind of article is selected, and an access or delivery opening 115 through which a discharged article is obtained.

Figure 2:
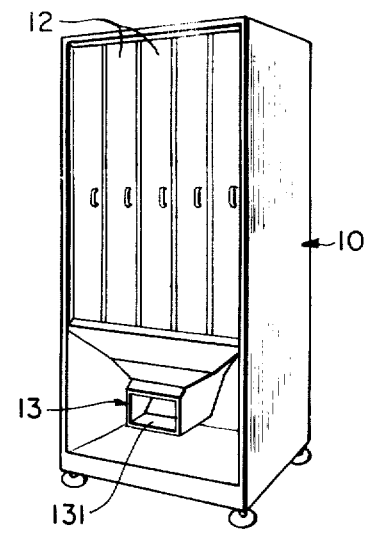
FIG. 2 shows a perspective view of a machine in FIG. 1, with a front, or loading, door being disassembled.

Referring to FIG. 2 which shows a perspective view of the machine cabinet 10 with the front door 11 being disassembled, in the cabinet 10, article storage unit devices 12 (five devices are shown) are mounted side by side. Under the unit devices 12, a downwardly sloping chute 13 is mounted, with a lower open end 131 thereof being matched to the access opening 115 of the front door.

The vending machine is provided with coin mechanism, coin stoker and control circuits, but they are omitted for the simplification because this invention is not directed to them.

Each unit device 12 is slidably mounted in the cabinet 10 to be smoothly and easily drawn out.

Figure 3:
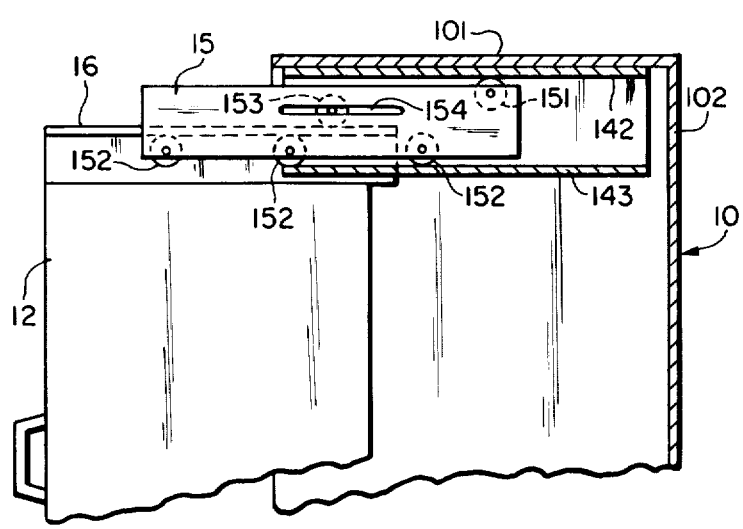
FIG. 3 shows a sectional view of an arrangement by which each unit is slidably mounted in a machine cabinet.
Figure 4:
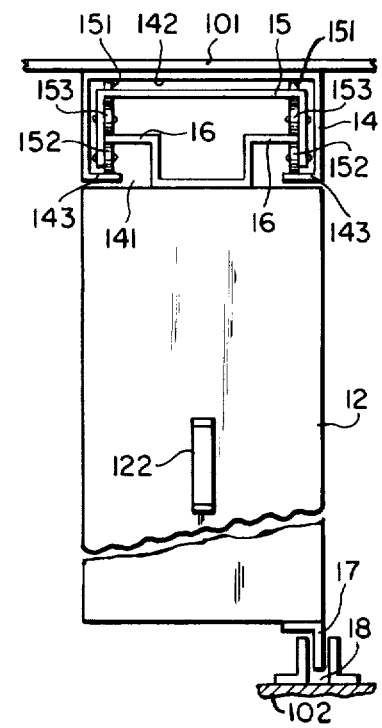
FIG. 4 shows a front view of each unit device being mounted in the machine cabinet.

Referring to FIGS. 3 and 4, on an inner surface of a top board 101 of the machine cabinet 10, guide rails 14 are fixedly disposed for guiding respective unit devices 12 and extend in parallel with one another and between the front end and the rear plate 102 of the cabinet. Only one guide rail is shown in FIGS. 3 and 4 together with a corresponding one unit device 12.

The guide rail 14 is formed in a rectangular cylindrical form but is formed with an elongated slot 141 facing the unit device 12 and extending along the guide rail. A slider 15 is mounted slidably in and along the guide rail 14. This is realized by the provision of a pair of rollers 151 which engage with and run along the upper inner surface 142 of the rail 14 and three pairs of rollers 152 which engage with and run along inner surfaces of two lower plate portions 143 which define the elongated slot 141.

The slider 15 is also provided with a pair of rollers 153 for guiding support plates 16 of the unit device 12 in cooperation with the three pairs of rollers 152.

The unit device 12 is provided with two elongated supports 16 with L-shape section which are fixedly mounted on the upper surface of the unit device in such fashion that L-shape is inverted. Two L-shaped supports may be integrally formed with a sheet of plate by bending process, as shown in the drawing.

The supports 16 are disposed between the rollers 153 and the rollers 152 to be slidably guided.

Accordingly, the unit device is slidably mounted in the cabinet.

The slider 15 is formed in an elongated member with a C-shape section, as shown, and all rollers are rotatably mounted on opposite side walls of the slider. The pair of rollers 153 for guiding the L-shape supports 16 are so mounted on the side walls that shafts of the rollers may be movable along the slider over a limitted extent as shown by slots 154, in which the shafts are engaged respectively.

Furthermore, the unit device 12 is provided with an elongated guide plate 17 on the bottom surface near the edge, as shown in FIG. 4. The guide plate 17 is inserted or received in a guide groove 18 which is formed on a machine frame 102 so that the unit device 12 is prevented from the undesired lateral pendulous movement.

As will be described hereinafter, in each article storage unit device, articles are stored in such fashion a plurality of vertical stacks of articles are formed within the unit device.

In this embodiment, unit devices store different kinds of articles from one another.

Figure 5:
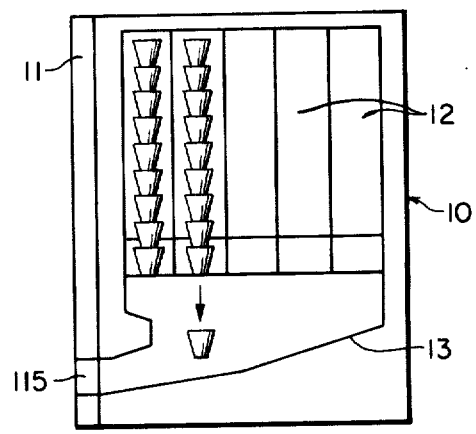
FIG. 5 shows a sectional view of the vending machine in FIG. 1, schematically showing the discharge of articles.

Referring to FIG. 1, when a purchaser inserts coins through the coin depositing opening 111 and push an article selecting button 114, a corresponding unit device 12 discharges an article, as shown in FIG. 5, by the operation of control circuits (not shown) and the article discharge means which are described hereinafter.

The discharged article is transported to the access station by the common chute 13. Accordingly, the purchaser can obtain the desired article through the access opening (115, in FIG. 1).

Figure 6:
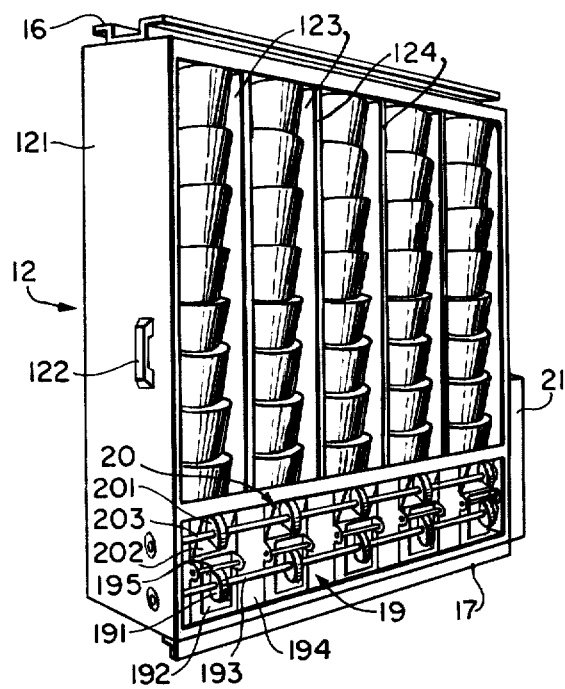
FIG. 6 shows a perspective view of an article storage unit device.

Referring to FIG. 6, which shows a perspective view of an article storage unit device 12, the unit device comprises a housing 121 and a handle 122 fixed to a front plate of the housing. The housing 121 defines vertically extending spaces 123 partitioned by vertically extending partition walls 124. The vertical spaces (five spaces are shown) are arranged along a direction from the front end to the rear end of the unit device, and terminate at the lower end in a bottom opening (125, in FIG. 7) which is provided to the bottom of the housing 121.

Stoppers 19 are provided to the housing 12 at lower portions of respective vertical spaces and adjacent to the bottom opening, each of which is for holding an article within the space at the position of the stopper. So that, a predetermined number of articles are stored in each vertical space with a vertical stack form.

The stopper 19 is arranged releasable for permitting the lowermost article in the stack to fall through the bottom opening 125 in order to discharge articles from the unit device.

The housing 121 is also provided with additional stoppers 20, each of which is for holding an article adjacent to, and above, the lowermost article in each space 123.

Each additional or upper stopper 20 is operatively so connected with each corresponding lower stopper 19 that the holding operation of the former is effected only a time period when the latter is released.

As a result, from each article storing space 123, one article or the lowermost article is discharged at a time, and after discharge of the lowermost article, the remaining articles are lowered by an article hight so that a fresh article is held by the lower stopper 19.

Figure 7:
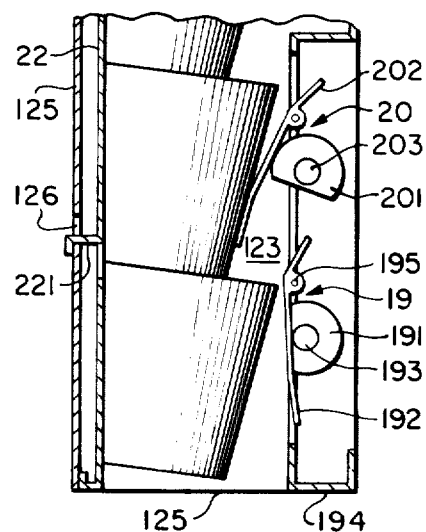
FIG. 7 shows a sectional partial view of the unit device in FIG. 6.

Referring to FIGS. 6 and 7, in the shown embodiment, each of the lower stopper 19 comprises, in combination, a cam disk 191 and a stopper plate 192.

The cam disk 191 is mounted on a cam shaft 193 in such fashion that a circumference cam contour of the cam disk 191, faces the corresponding article storing space. The stopper plate 192 is pivotally mounted to frames 194 by a pin 195 and is freely pendent between the corresponding article storing space 123 and the cam disk 191 to engage with the cam disk. Therefore the stopper plate 192 serves as a cam follower of the cam disk 191.

The cam contour of the cam disk 191 is generally formed with a circular plane but is partially formed with a flat plane as shown in FIG. 7. Therefore, when the stopper plate 192 follows the circular portion of the cam contour, the stopper plate 192 protrudes into the article storing space 123 so that an article is held within the space at the position. On the other hand, when the stopper plate 192 follows the flat portion of the cam contour, the protrusion of the stopper plate 192 is reduced sufficiently to release the holding operation so that the article is permitted to fall through the bottom opening 125.

The upper stopper 20 similarly comprises, in combination, a cam disk 201 and a stopper plate 202, which are arranged similarly as the cam disk 191 and the stopper plate 192.

However, it should be noted that the upper cam disk 201 and the lower cam disk 191 are arranged different in the angular position of the rotation so that the upper stopper plate 202 protrudes into the article storing space 123 upon the lower stopper 19 being released, while the upper stopper plate 202 being restored from the protrusion after the lower stopper 19 again effecting the holding operation.

The cam shaft 193 of the lower cam disk 191 is rotated together with the rotation of a cam shaft 203 in a direction by a common driver or an electric motor 21. In the case, the flat portion of the cam contour of the lower cam disk 191 is arranged to be angularly prior to the flat portion of the cam contour of the upper cam disk 201.

Referring to FIG. 6, all of the lower stoppers 19 and all of the upper stoppers 20 are arranged similarly as above described arrangement. But it should be noted that all of the lower cam disks 191 are mounted on the common cam shaft 193 which is driven by the driver 21 and that all of the upper cam disks are mounted on the common cam shaft 203 which is also driven by the common driver 21.

Moreover, it should be noted that the flat portion of the cam contour of each one of lower cam disk 191 is arranged angularly different around the common cam shaft 193 from the other ones. Accordingly, similar angular differences are provided between each one of upper cam disks 201 and the other ones.

In the shown arrangement having five article storing spaces 123, the angular difference between the adjacent two cam disks is given by 360°/5 = 72°. Thus, if cam shafts are rotated by the angular distance of 72° by one operation of the common driver 21, one article is discharged from a first article storing space by a first operation of the driver 21, and an article is discharged from a second article storing space by a sequential second operation of the drive. When cam shafts are rotated over a complete revolution by five times operations of the driver 21, five articles have been discharged from the unit device 12.

The unit device 12 may be open at one side thereof, as shown in FIG. 6, or may be closed by an openable side plate so that feeding operation of articles may be carried out at the open side.

At the opposite side, the unit device 12 is closed by a side plate 125. In each article storing space 123, an elongated plate 22 is movably mounted adjacent to the side plate 125, for adjusting the article storing space according to the measurement of articles to be stored in the space. To hold the movable plate 22 at a desired position, a projection 221 formed on the plate 22 is engaged with a hole 126 formed in the side plate 125.

Figure 9:
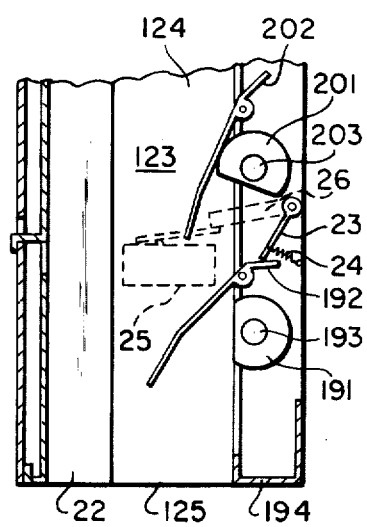
FIG. 9 shows a sectional partial view of the unit device in FIG. 6, with means for detecting the empty of an article storing space of the unit device.

The adjusting plate 22 may be a flat plate or a plate with a concave lateral section, as shown in FIG. 9.

Figure 8:
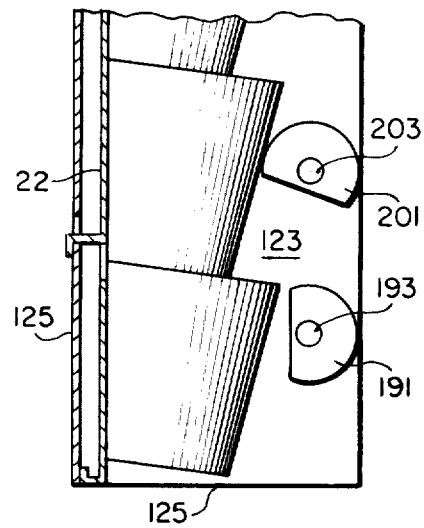
FIG. 8 shows a similar view of a modification as in FIG. 7.

In the embodiment shown in FIGS. 6 and 7, lower and upper stopper plates 192 and 202 may be omitted. This modification is shown in FIG. 8 as a similar view as FIG. 7. Similar parts are indicated by same numerals in FIG. 7.

As clearly understood from FIG. 8, lower and upper cam disks 191 and 201 directly engage with articles and control the holding and discharging operations of articles.

The embodiment shown in FIGS. 6 and 7 is provided with means for detecting the empty in each article storing space 123, as shown in FIG. 8.

Referring to FIG. 8, a lever 23 is pivoted to the machine frame 194 with a free end thereof being engaged with the upper end of the lower stopper plate 192. The lever 23 is urged by a spring 24 to be so rotated in one direction about the pivot that the lower end of the stopper plate 192 protrudes into the article storing space 123.

On the partition wall 124, a microswitch 25 is mounted which is normally off.

An arm 26 is connected to the lever 23. The arm 26 is moved together with the lever 23. When the lever 23 is moved by the spring 24 to protrude the stopper plate 192 into the article storing space 123, the arm 26 engages with the microswitch 25. Accordingly microswitch 25 turns on.

The spring 24 may be provided to urge the arm 26.

If an article exists against the lower stopper plate 192, the lower stopper plate 192 does not protrude into the article storing space and, therefore, the lever 23 and the arm 26 are not rotated. Accordingly, the microswitch 25 is not turned on.

Therefore, when no article is stored or stacked in the article storing space, and when stacked articles are not moved downwardly because of certain obstacles so that no article exists at the lower stopper 19, the microswitch 25 is operated to turn on.

If an indicator or a lamp is provided which is controlled by the microswitch 25, it is indicated that the article cannot be vended.

According to this invention, the inner space of the machine cabinet is effectively used for storing articles so that a number of articles and a plurality of kinds of articles can be stored in the comparatively smaller cabinet. Furthermore, since each unit device 12 can be drawn out independently, an operation for feeding articles is easily and safely performed.

This invention has been described in connection with specific embodiments, it will be understood to those skilled in the art that various modifications and other designations are easily made within the scope of this invention.

What is claimed is:

1. An article storage unit device with means for discharging one article at a time for use in a vending machine, comprising a housing defining at least one article storing space in which articles are stored in a vertical stack and having a bottom opening for providing a passage through which an article is discharged, first stop means for holding the lowermost one of said vertically stacked articles at a position facing said bottom opening and being temporarily releasable for permitting the discharge of the lowermost article in the vertical stack, second stop means for temporarily holding an article adjacent to and above said lowermost article in the vertical stack for only the time period during which said first stop means is being released, driving means for temporarily driving said first stop means to be released and contemporaneously driving said second stop means to hold, whereby only one lowermost article in the vertical stack is discharged from said bottom opening, said first stop means comprising first cam means mounted on a first driving shaft, said first cam means permitting articles in said article storing space to pass when disposed at a first predetermined angular position by the rotation of said first driving shaft and engaging with and holding the article when disposed at a second predetermined angular position by the rotation of said first driving shaft, said second means comprising second cam means mounted on a second driving shaft, said second cam means permitting articles in said article storing space to pass when disposed at a predetermined angular position by the rotation of said second driving shaft and engaging with and holding the article when disposed at a second predetermined angular position by the rotation of said second driving shaft, and said first and second driving shafts being operatively and commonly connected to said driving means with an angular difference therebetween whereby said second cam means holds an article during the time said first cam means permits articles to pass, and first and second plate means movably mounted to follow the cam contour of said first and second cam means, respectively, said first plate means being operable to engage an article when said first cam means is disposed in said second predetermined angular position and to release the article when said first cam means is disposed in said first predetermined angular position, and said second plate means being operable to engage an article when said second cam means is disposed in said second predetermined angular position and to release the article when disposed in said first predetermined angular position.

2. An article storage unit device with means for discharging one article at a time for use in a vending machine, comprising a housing defining a plurality of vertically extending spaces partitioned by vertically extending partitioned walls and having a bottom opening, said a plurality of vertically extending spaces being for storing articles in vertical stacks and being arranged along a horizontal direction from a front end to a rear end of said housing, each of said vertically extending spaces terminating in said bottom opening, a plurality of first cam means each of which is disposed to hold the lowermost one of articles stacked in each one of said a plurality of vertically extending spaces at an angular position of a rotation thereof and to release said lowermost article at the other angular position, a plurality of second cam means each of which is disposed to hold an article adjacent to and above said lowermost one of articles stacked in each one of said a plurality of vertically extending spaces at an angular position of a rotation thereof and to release said article adjacent to and above said lowermost one at the other angular position, first cam shaft means on which said a plurality of first cam means are commonly mounted in such fashion that said release positions of said first cam means are at different angular positions around said first cam shaft means from one another, second cam shaft means on which said a plurality of second cam means are commonly mounted in such fashion that said release position of said second cam means are at different angular positions around said second cam shaft means from one another, and driving means to which said first and second cam shaft means are commonly connected in such fashion that when any one of said a plurality of first cam means is at the release position, corresponding one of said a plurality of second cam means is at the holding position.

3. The article storage unit device as claimed in claim 2, which further comprises a plurality of first plate means which are movably mounted to follow cam contours of said a plurality of first cam means, respectively, on a side of the article spaces in relation to said first cam means, and a plurality of second plate means which are movably mounted to follow cam contours of said a plurality of second cam means, respectively, on a side of the article spaces in relation to said second cam means.

4. The article storage unit device as claimed in claim 3, which further comprises a plurality of elongated plates each of which is movably mounted within each of said a plurality of vertically extending spaces to adjust the article storing space according to the size of an article.

5. The article storage unit device as claimed in claim 3, which further comprises first means for providing a torque to said first plate means to move into the article storing space at a time of the absence of said lowermost article, arm lever means moving together with said first plate means by the torque of said first means, and microswitch means being energized by said arm lever means upon the movement of said lever arm means, whereby the absence of the lowermost article in the article storing space is detected.

6. The article storage unit device as claimed in claim 2, which further comprises a plurality of elongated plates each of which is movably mounted within each of said a plurality of vertically extending spaces to adjust the article storing space according to the size of an article.

7. In an article vending machine including a cabinet with an open front end, a door closing the open front end of said cabinet and having an article access opening, an article storage device provided within said cabinet, an article discharge device for discharging one article at a time from said article storage device, and means for transporting the discharged article to said article access opening, the improvement which is characterized in that said article storage device comprises a plurality of unit assemblies being arranged side by side and being slidably mounted to be drawn out of said cabinet, each of said unit assemblies comprising a housing defining a plurality of vertically extending spaces partitioned by vertically extending partitioned walls and having a bottom opening, said plurality of vertically extending spaces being for storing articles in vertical stacks and being arranged along a horizontal direction from a front end to a rear end of said housing, each of said vertically extending spaces terminating in said bottom opening, a plurality of first cam means each of which is disposed to hold the lowermost one of articles stacked in each one of said plurality of vertically extending spaces at one angular position of a rotation thereof and to release said lowermost article at a second angular position, a plurality of second cam means each of which is disposed to hold an article to and above said lowermost one of articles stacked in each one of said plurality of vertically extending spaces at one angular position of a rotation thereof and to release said article adjacent to and above said lowermost one at a second angular position, first cam shaft means on which said plurality of first cam means are commonly mounted so that said release positions of said first cam means are at different angular positions around said first cam shaft means from one another, second cam shaft means on which said plurality of second cam means are commonly mounted so that said release positions of said second cam means are at different angular positions around said second cam shaft means from one another, and driving means to which said first and second cam shaft means are commonly connected so that when any one of said plurality of first cam means is at the release position, the corresponding one of said plurality of second cam means is at the holding position.

8. The vending machine as claimed in claim 7, wherein each unit device further comprises a plurality of first plate means which are movably mounted to follow cam contours of said a plurality of first cam means, respectively, on a side of the article spaces in relation to said first cam means, and a plurality of second plate means which are movably mounted to follow cam contours of said a plurality of second cam means, respectively, on a side of the article spaces in relation to said second cam means.

9. The vending machine as claimed in claim 8, wherein each unit device further comprises a plurality of elongated plates each of which is movably mounted within each of said a plurality of vertically extending spaces to adjust the article storing space according to the size of an article to be stored.

10. The vending machine as claimed in claim 8, wherein each unit device further comparises first means for providing a torque to said first plate means to move into the article storing space at a time of the absence of said lowermost article, arm lever means moving together with said first plate means by the torque of said first means, and microswitch means being energized by said arm lever means upon the movement of said lever arm means, whereby the absence of the lowermost article in the article storing space is detected.

11. The vending machine as claimed in claim 7, wherein each unit device further comprises a plurality of elongated plates each of which is movably mounted within each of said a plurality of vertically extending spaces to adjust the article storing space according to the size of an article to be stored.

* * * * *